May 28, 1968          R. N. CAMPBELL          3,384,920
VEHICLE MOUNTED CLEANING DEVICE
Filed May 24, 1965                                        3 Sheets-Sheet 1
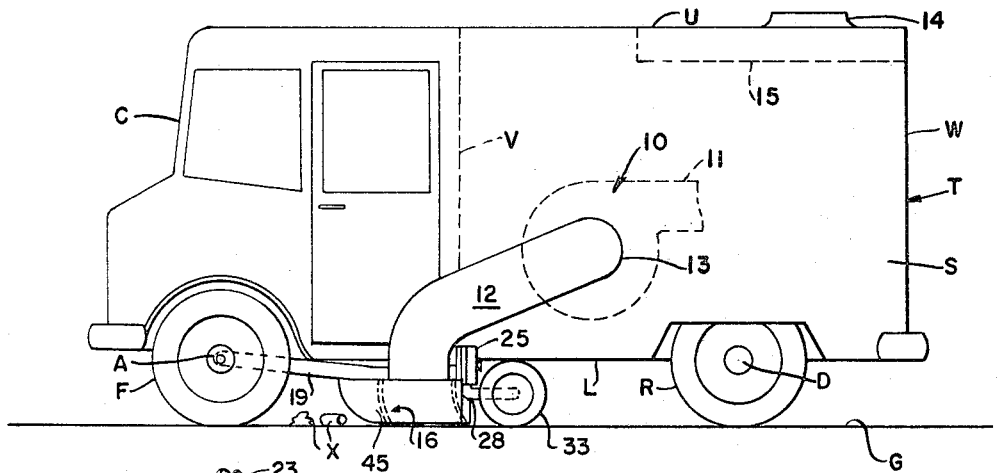
FIG.1.
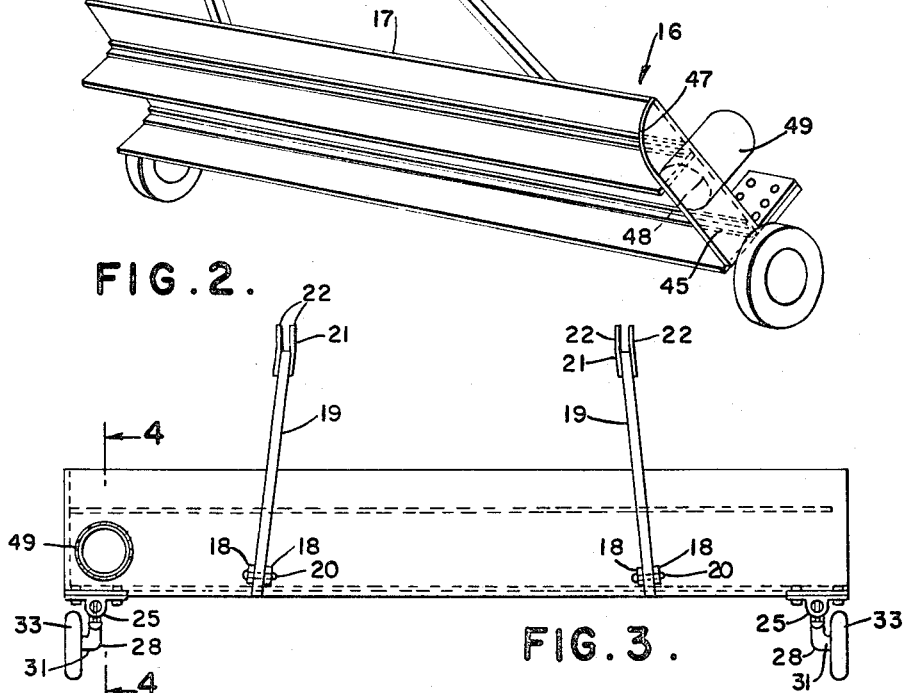
FIG.2.
FIG.3.
FIG.4.
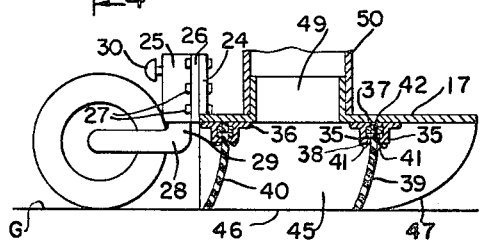
*INVENTOR*
Richard Nelson Campbell
BY
*ATTORNEY*

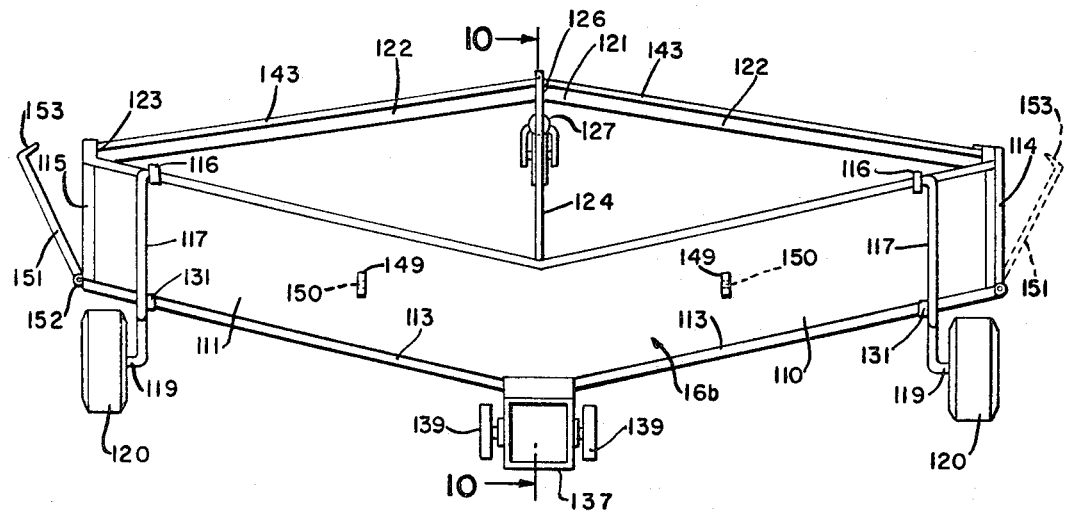

United States Patent Office 3,384,920
Patented May 28, 1968

3,384,920
VEHICLE MOUNTED CLEANING DEVICE
Richard Nelson Campbell, 2005 George Washington Road, Vienna, Va. 22180
Filed May 24, 1965, Ser. No. 457,960
5 Claims. (Cl. 15—340)

The present invention relates to improvements in vacuum cleaning apparatus, and more particularly to a vacuum head or wing supported beneath a motor vehicle for cleaning outdoor surfaces formed of asphalt, cement and the like on parking lots, airport runways, driveways and various other surfaces of greatly increased size and area.

One object is to provide a transversely extending vacuum head supported beneath a motor vehicle to extend transversely of the direction of vehicle travel, and which head is provided with flexible ground engaging members along at least three sides thereof and provided with a reduced pressure source for creating a vacuum flow stream from one end of the vacuum head to a remote point to which said reduced pressure source or suction tube is connected. The other end of the tube being connected to the intake of an air blower driven from the power shaft of the motor vehicle or from a separate prime mover installed on the vehicle.

Another object is to provide a vacuum cleaning mechanism of the above type in which the front and rear ground engaging elements are removably attached to their supports to permit the same to be quickly and easily removed when worn and replaced by new sealing strips.

Another object is to provide a transversely extending suction head supported and propelled by a wheeled vehicle of the truck type in which the front and rear ground engaging flexible sealing strips are supported in such a manner that the front strip will be arcuately curved in a direction downwardly and rearwardly with respect to its direction of travel and will permit the passage of relatively large objects such as empty beverage cans and bottles, as well as various other articles of increased size. The trailing sealing strip being flexed and curved transversely with respect to its length to effectively seal a comparatively large portion of the suction head but yet will flex to permit the passage of the head over irregular and uneven surfaces without breaking the vacuum seal between the rear flexible strip and the surface over which the same is propelled.

Another object is to provide a vacuum cleaning mechanism for so-called blacktop surfaces which are relatively smooth as used in shopping center parking lots, airfield runways and roads as well as other surfaces of greatly increased area in which the cleaning mechanism is supported on a wheeled frame or the like connected to the chassis of the motor vehicle in such a manner as to be propelled thereby along a straight line path with the suction head extending transversely and at an angle to the direction of vehicle travel. The suction head projecting beyond the vehicle track a sufficient distance so that a relatively wide swath or area will be cleaned during each passage of the mechanism along said pathway.

Another object is to provide a vacuum cleaning mechanism in which the vacuum head can be adjusted relative to the ground surface to compensate for wear of the flexible sealing strips and to adjust the head a predetermined distance with respect to the surface being cleaned so that the front and rear sealing strips will flex slightly in the same direction opposite the direction of vehicle travel along said pathway.

Another object is to provide a vacuum cleaning head or casing movable along a pathway in which one end of said head or casing is connected to a reduced pressure source such as a suction fan, and the opposite end of the casing is open to create a forced air flow along a horizontal path above the surface being cleaned which extends transversely to the direction of the propelling vehicle.

Another object is to provide a vehicle propelled vacuum cleaner head or casing which is sealed along the front and rear edges and can optionally be opened at either end to create a suction air flow path above the surface being cleaned from either end of the casing or head, thus enabling the mechanism to be used for cleaning the curb areas of parking lots and the like while traveling in either direction.

Another object is to provide a motor vehicle propelled vacuum cleaner head or casing extending transversely of the vehicle pathway and having front and rear ground engaging sealing strips and a reduced pressure vacuum source connected at a point remote from an open end of said housing or casing, whereby a vacuum air flow path will be created from the open end of the casing to said remote point.

Another object is to provide a vacuum cleaning head adapted to be propelld along a straight line pathway beneath a motor vehicle, and which head is constructed to provide rearwardly converging wing sections which diverge in direction of a reduced pressure source remote from the ends of the wing sections so that the debris will be directed inwardly toward said suction source during the forward travel of the vacuum cleaning mechanism along said pathway.

Another object is to provide a vacuum cleaning mechanism of the above-mentioned type having yieldingly supported spring fingers extending along the front of the sealing strips to engage various pieces of trash and debris which have a tendency to stick to the surface being cleaned by the vacuum mechanism.

It can be demonstrated, that discarded articles such as receptacles and the like deposited on parking lots can be quickly removed due to the creation of an air flow pathway produced by a suction source when the leading and trailing edges of the casing are sealed and one end is closed by being in ground engagement with the surface being cleaned, and that conventional cleaners of this type in which a space is provided around the lower edge of the head will not remove articles of this type due to the fact that the reduced pressure is insufficient to overcome the inertia of the articles. However, in the present invention the articles are set in motion by the horizontal flow created by the reduced pressure source and hence the inertia is overcome and the articles are removed when they reach the limit of their travel along the transverse pathway.

Other objects and advantages of the invention will become apparent during the course of the following description of the accompanying drawing wherein:

FIGURE 1 is a side elevational view of a vacuum cleaning mechanism showing the manner in which the same is supported by a motor vehicle truck and showing the connection at one end of the suction head attached to a reduced pressure source such as the intake of a fan supported in the motor vehicle.

FIGURE 2 is a perspective view of the vacuum cleaner head showing the same disconnected from the vehicle and illustrating the manner in which the head is constructed with the flexible ground engaging sealing strips extending continuously along the entire length of the cleaner head.

FIGURE 3 is a top elevational view of the vacuum cleaner head showing the supporting wheels therefor which can be adjusted to position the cleaner head at predetermined spaced distances from the surface being cleaned.

FIGURE 4 is a transverse cross-sectional view taken on line 4—4 of FIGURE 3 looking in the direction of the arrows and illustrating the manner in which the flexible sealing strips are arcuately curved in a direction transverse of their length so that the lower edge will be urged into continuous contactual sealing engagement with the ground surface but yet allow the articles to be collected to pass beneath the leading sealing strip while the trailing strip is being additionally urged into sealing engagement with the surface by the reduced pressure within the vacuum head.

Figure 5:
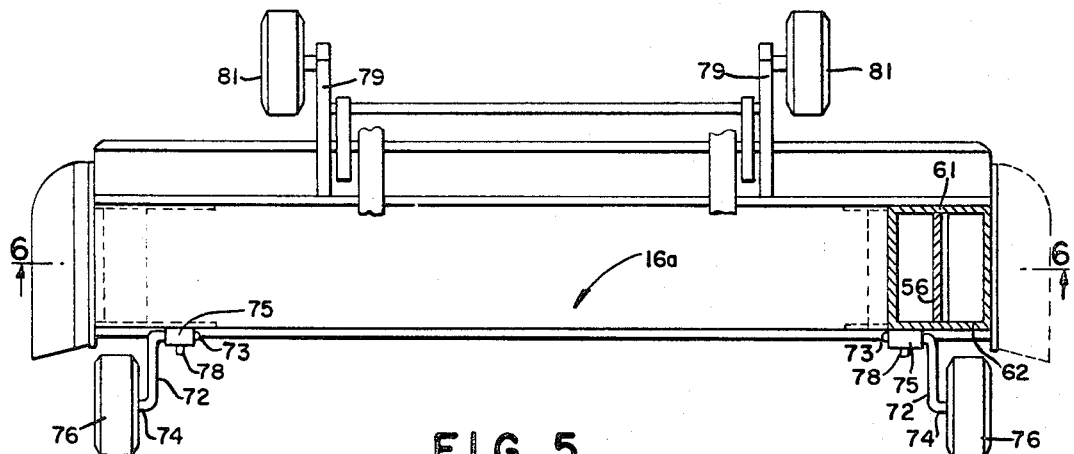

FIGURE 5 is a top plan view of a modified form of the invention illustrating a vacuum cleaner head in which the front and rear edges are sealed and the end edges optionally closed to alternately permit the cleaner head to be used while cleaning curbs or the like from either side of the cleaner mechanism while the cleaner head is being propelled in a selected direction along the vehicle pathway.

Figure 6:
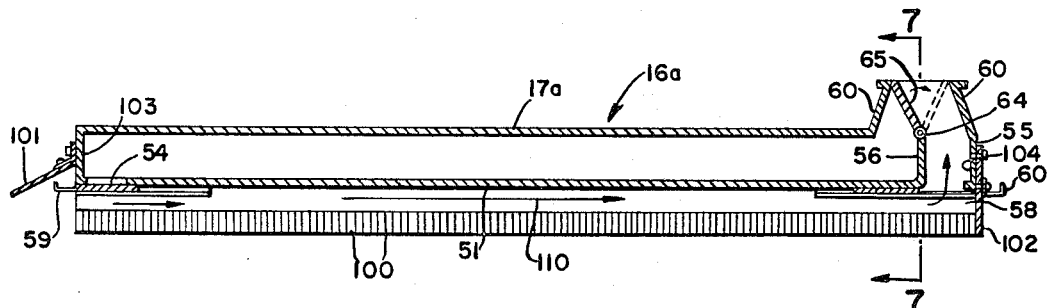

FIGURE 6 is a longitudinal cross-sectional view taken on line 6—6 of FIGURE 5 looking in the direction of the arrows to illustrate the structure of the vacuum cleaner head and the valve arrangement for alternately closing and opening the end walls when the cleaner head is optionally used for cleaning areas adjacent curb lines and the like.

Figure 7:
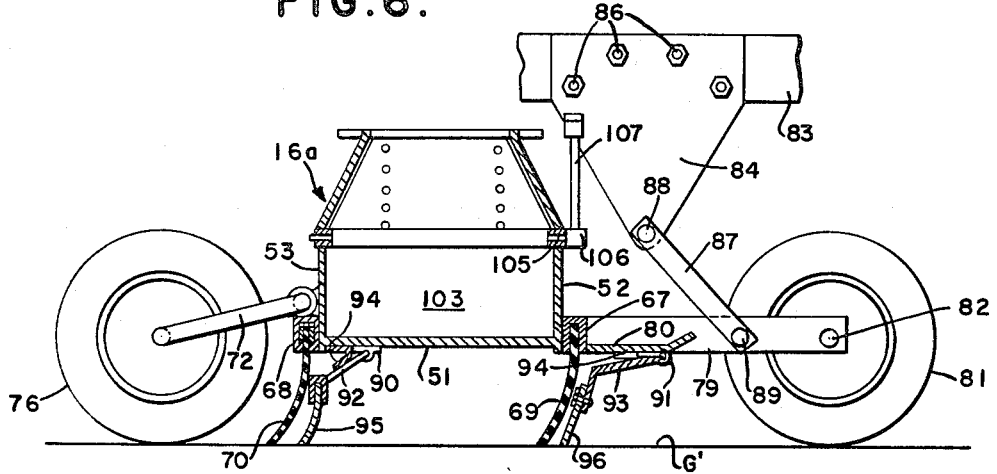

FIGURE 7 is an enlarged cross-sectional view taken on line 7—7 of FIGURE 6 looking in the direction of the arrows to illustrate the manner in which the vacuum head or wing-like structure is supported on a wheeled frame and connected to the chassis of a motor vehicle for being propelled thereby.

FIGURE 8 is a top elevational view of a modified form of the invention which is adapted to be connected and propelled by a motor vehicle as before, but in which the wings of the vacuum casing or head diverge forwardly in the direction of cleaner head travel along the vehicle pathway.

FIG. 9 is an end elevational view of a modified form of the invention shown in FIGURE 8, and FIGURE 10 is a transverse cross-sectional view taken on line 10—10 of FIGURE 8 illustrating various details of construction and the manner in which the suction hose connection is yieldingly and rockably supported to prevent the forward lower edge thereof from being mutilated when the same engages obstructions in its pathway.

In the drawings, and more in detail, attention is first directed to FIGURES 1 to 4 inclusive, wherein there is shown one embodiment of the invention which includes a panel body delivery truck generally designated T having a steering assembly including an axle A for the supporting wheels F. The rear wheels R are connected to the drive axle D in the usual manner. The truck T is provided with a forward cab C for the driver and the cab C is separated from the side walls and rear compartment formed between the top and bottom walls U and L. The rear compartment is completed by a vertical wall V and a rear wall W which is provided with the usual access doors. Thus, a closed compartment is formed in the trunk body T which forms a receptacle for debris and trash collected by the vacuum cleaner.

Supported on the wall L of the truck body is a suitable air blower generally designated 10 having its exhaust 11 in communication with the chamber of the truck, while its intake is connected to a flexible duct 12 extending through an opening 13 in one of the side walls S. A separate prime mover such as a gasoline engine (not shown) is mounted on the floor L of the truck and has its drive shaft drivingly connected to the shaft of the air blower so that the impeller of said blower will rotate in a clockwise direction looking at FIGURE 1.

The top wall of the truck body T as at V is provided with a vent pipe or duct 14 communicating with the atmosphere and directly below said air duct is a filter screen 15 which extends between the side walls of the truck S and has its forward end connected to the top wall V. Thus, the filter screen 15 prevents the discharge of refuse through the exhaust duct 14 when the vacuum cleaning apparatus is in operation. The heavier particles of collected trash fall to the floor L and can be removed through the rear wall W by opening the access doors thereon (not shown).

The truck structure illustrated in FIGURE 1 is employed in connection with all forms of the invention illustrated in FIGURES 1 to 10 inclusive, but obviously the structure can be modified so that the intake duct 12 can be located at different positions.

In the form of the invention shown in FIGURES 1 to 4 inclusive the vacuum cleaner head is generally designated 16, and said head includes a top wall 17 on the rear edge of which is affixed sets of spaced upstanding lugs 18. Draft bars 19 have their rear ends pivotally connected between the lugs by suitable pivot pins 20 held in place in any approved manner. The forward ends of the draft bars 19 are provided with suitable fittings 21 having spaced end portions 22 adapted to receive lugs secured to the axle A of the truck and be pivoted thereto by suitable pivot pins extending through the aligned openings 23 in the fittings 21 to pivotally support the vacuum cleaner head 16 and permit the same to rise and fall during its travel over uneven surfaces.

Affixed to the rear edge of the plate 17 is a pair of spaced upstanding brackets 24 which are welded or otherwise attached to the plate, and said plates are provided with a series of vertically spaced openings for receiving suitable fastening elements. Secured to each of the plates 24 is a clamping bracket 25 a flange of which as at 26 is secured to the upstanding plate 24 by suitable threaded fasteners 27. An angle bar 28 is provided with a vertically extending portion 29 which is received in the tubular bracket 25 and can be locked in place by means of a set screw 30. The other end of the angle bar 28 is bent as at 31 to form an axle for rubber tired supporting wheels 33. Thus, the wheels 33 can be adjusted to raise and lower the plate 17 with respect to the ground surface.

Secured to the underside of said casing plate 17 and along the front and rear edges thereof, are spaced apart Z bars 35 and 36 arranged in parallel sets forwardly and rearwardly of the longitudinal center of the casing plate 17. The Z bars of each set are arranged in opposed relation to provide a channelway therebetween as at 37 with the opposed flanges 38 arranged in spaced relation to form a restricted slot or passage therebetween.

Removably supported between the sets of Z bars 35 and 36 are front and rear ground engaging sealing strips 39 and 40 which are formed of a flexible material such as rubber, rubber compositions and synthetic rubber compositions such as neoprene and the like having long wearing characteristics and sustained flexing life. The strips 39 and 40 are approximately ¼ inch in thickness to sustain their self in position so that the lower edges will continuously be urged into yielding sealing engagement with the surface and prevent the suction in the cleaner head from drawing said sealing strips upwardly in the direction of the plate 17. The upper edges of the strips 39 and 40 are sandwiched between wooden strips 41 held in place by adhesive or suitable fastener elements such as through nails 42, and said wooden strips 41 are shaped to conform to the channelway 37 between each set of opposed Z bars 35. Thus, the sealing strips 39 and 40 can be removed for replacement after becoming worn by sliding the same longitudinally out of the channels 37 and immediately inserting a new sealing strip of the same dimensions.

The sealing strips 39 and 40 can be constructed of synthetic resin compositions including various thermo-setting phenol condensation products of various phenols and resins such as methylmethacrilate, cellulose acetate, cellulose butyrate, cellulose nitrate, ethyl cellulose, polyvinyl chloride, vinyl chloride, and any of the lower alkyl alcohols such as methyl, ethyl, propyl, butyl or amyl alcohol can be used. The sealing strips are of a thickness of ¼ inch to ¾ inch depending upon the material and upon the reduced pressure force created by the blower, and these dimensions can be easily determined by providing a sealing strip of a suitable thickness such as to sustain a sealing strip in continuous sealing contactual engagement with the surface and against movement away from the ground surface G against the force created by the suction of the blower 10, but yet having sufficient flexing characteristics as to permit the passage of trash such as cans and the like X (FIGURE 1) beneath the leading sealing strip 39.

The sealing strips 39 and 40 extend continuously along the entire length of the casing plate 17 and are secured to one end of the casing plate 17 by a shoe 45 which is secured in place by suitable threaded fasteners or the like (not shown). The ground engaging shoe 45 is provided with a runner surface 46 which engages the ground surface G and is curved upwardly and forwardly at its front end as at 47.

Formed in the casing plate 17 at one end thereof adjacent the runner 45 is an opening 48 to which is attached a pipe fitting 49 for receiving the lower end of the flexible conduit 12. The opposite end of the casing plate 17 is open, and it is to be noted that the end portions of a vacuum device 16 extend beyond the side walls S of the truck body for a considerable distance to permit the cleaning of relatively large areas such as shopping center parking lots and various other surfaces of increased size which become littered with discarded wrappers, containers and the like.

In operation, the engine of the truck T is started in the usual manner as is also the prime mover for the air blower 10. The suction head or chamber formed between the casing plate 17, front and rear sealing strips 39-40 and runner 45 are adjusted so that they engage the ground surface G and are flexed as shown in FIGURE 4. The suction created in the flexible duct 12 produces a horizontal air current in a direction transverse to the direction of vehicle travel such as to dislodge and carry articles such as cans and the like in the direction of the cylindrical fitting 49 where they are sucked through the flexible pipe 12 and deposited in the body of the truck T. Larger articles of trash X may easily pass beneath the leading sealing strip 39 without breaking the continuous seal between the lower edge of the strip and the ground surface G and eventually are conveyed transversely along the longitudal axis of the casing plate 17 and finally discharged through the duct 12 and exhaust 11 of the air blower 10.

The sealing strips 39 and 40 are normally set so that the lower edges will engage the ground surface G and by reason of the direction in which the vacuum cleaner 16 is propelled the leading strip 39 will yieldingly flex downwardly and rearwardly into contactual sealing engagement with the ground surface but yet have sufficient flexibility to permit the passage of trash therebeneath, and and while the trailing strip 40 is flexed in a similar direction it is prevented from being drawn or sucked upwardly by the vacuum force created by the blower 10 due to its self sustaining properties.

The runner 45 effectively seals one end of the vacuum cleaner head 16 and the reduced pressure between the sealing strips 39 and 40 has a tendency to draw the runner 45 into engagement with the end edges of the strips, since the runner 45 is formed of a flexible material similar to the sealing strips but of greater thickness so that the runner 45 is self-sustaining.

After the chamber in the truck T has collected sufficient debris and trash the operator can enter the chamber when the machine has been shut down and sweep the trash and debris into a suitable trash collection container, or the trash may be discharged on a vacant lot in a pile for later removal.

In the form of the invention shown in FIGURES 5, 6 and 7 there is illustrated a vacuum cleaner head generally designated 16a which is adapted to be connected beneath a truck similar to the one shown at T in FIGURE 1. The vacuum cleaner head 16a comprises elongated top and bottom walls 17a and spaced therebeneath is a lower wall 51 which is arranged in parallel relation and is connected to the upper casing plate 17a by front and rear walls 52 and 53 respectively. Thus, an upper chamber is formed above the division wall 51 and a lower chamber is formed beneath the wall 51 and the ground surface.

Adjacent one end of the vacuum cleaner head 16a in the lower plate 51 is a cut away portion 54 forming an opening, while the opposite end of the plate 51 terminates a short distance from the end wall 55 and is bent upwardly as at 56 to form a vertical division wall. An opening 58 is also formed at the end of the vacuum head 16a in opposed relation to the opening 54, and said openings are adapted to be closed by slide plates 59 and 60 guided in suitable guideways on the underside of the bottom plate 51.

A pipe connection 60 is formed on the casing plate 17a adjacent one end by vertically extending side walls connected by front and rear walls 61 and 62.

Pivotally connected to the upper end of the wall 56 is a butterfly valve 65 having a pivotal hinge connection 64. The slides 59 and 60 are adapted to be alternately opened and closed when the valve 65 is shifted to its alternate position so that a suction force can be created from either end of the vacuum cleaner head 16a.

Secured to the lower edges of the front and rear walls 52 and 53 are suitable channel strips 67 and 68 having sealing strips 69 and 70 with their upper edges removably secured to the channel strips 67 and 68 in a manner similar to that shown in the form of the invention illustrated in FIGURES 1 to 4 inclusive. The lower edges of said sealing strips yieldingly and continuously engage the ground surface G' (FIGURE 7) and the vacuum cleaner head 16a is provided with a pair of rearwardly extending bars 72 having parallel shaft portions 73 and 74. The shaft portions 73 are secured in bearing brackets 75 mounted adjacent the ends of the vacuum cleaner head 16a, and the other parallel shaft portions 74 are provided with rotatable supporting wheels 76. Suitable locking screws 78 are provided for holding the shaft portions 73 in a predetermined adjusted position so that the rubber sealing strips 69 and 70 will yieldingly and contactually engage the ground surface G' in continuous sealing engagement therewith and be flexed to the correct curvature.

Forwardly extending draft bars 79 are secured to the rear wall 52 by welding or the like, and are connected to an extended portion 80 of the lower wall 51. Supporting wheels 81 are secured to the bars 79 by axles 82 and the wheeled frame thus formed is adapted to be connected to the chassis 83 of a vehicle similar to that shown at T in FIGURE 1. Attached to each of the chassis frame bars 83 is a side plate 84 held in place by suitable threaded fasteners 86, and the lower portion of said plate 84 is connected to the forwardly extending draft bars 79 of the wheeled frame by means of connecting bars 87 which are held in place by suitable pivot pins 88 and 89.

Secured to the underside of the lower wall 51 of the vacuum cleaner head 16a and to the rear portion 80 thereof is a pair of bearing bracket members 90 and 91 having downwardly extending and rearwardly directed pivoted arms 92 and 93 yieldingly urged downwardly by means of suitable spring members 1 and 4. Connected to the lower end of said arms is a spring plate 95-96 provided with a series of spaced closely arranged slots extending inwardly from the lower edge to form a series of spring fingers 100 as shown in FIGURE 6. The spring fingers 100 yieldingly engage the ground surface and are adapted to dislodge various articles of trash which have a tendency to stick to the ground surface. When such trash articles are engaged by the spring fingers 100, they are loosened from the surface and are picked up by the suction in the vacuum cleaner head 16a.

Flexible runner strips 101 and 102 are secured to the end walls 103 and 104 of the casing of the vacuum cleaner head 16a.

A suitable flexible conduit similar to the one indicated at 12 in FIGURE 1 is adapted to have its lower end connected to the duct formed by the walls 60, 61 and 62 for creating a reduced pressure in the vacuum cleaner head 16a, and as before the upper end of the conduit will be connected to a blower so that the exhaust side thereof will be in communication with the suction head.

The shaft 64 of the butterfly valve 65 is journaled in suitable bearings in the upper ends of the walls 52 and 53 and one end thereof as at 105 projects through its corresponding bearing and has attached thereto the hub 106 of an operating lever 107 so that manipulation of the lever 107 will shift the valve 65 from its full line position in FIGURE 6 to its dotted line position.

In operation, the wheeled frame is connected to the chassis 83 in a manner similar to that shown in FIGURES 1 to 4 in which the suction head 16a extends transversely of the direction of vehicle travel, and is arranged beneath the vehicle between the front and rear wheels. The vacuum cleaner head 16a is adjusted as before so that the sealing strips will contactually engage the ground and are flexed in the direction opposite to the direction of vehicle travel. With the valve 65 shown in its full line position in FIGURE 6 the left hand runner shoe 101 is elevated and the slides 59 and 60 are moved so that the slide 59 closes its corresponding opening 54, while the slide 60 is open to permit air current flow created by the reduced pressure of the blower to travel from the left to the right as indicated (FIGURE 6) by the arrows 110. This arrangement permits cleaning of areas adjacent a curb area when the vehicle is traveling in one direction and when it is desired to reverse the vehicle the runner 101 is lowered and the runner 102 is elevated, while at the same time the valve 65 is shifted to its dotted line position (FIGURE 6) and the slide valves 59 and 60 are reversed. In the position of the valves air current travel is then from the right to the left (FIGURE 6) and through the chamber between the cleaner head plate 17a and the lower wall 51, and thence to the flexible duct similar to that shown in FIGURE 1 as at 12.

It is to be observed that the trailing set of spring fingers 95 are arranged adjacent the rear sealing strip and in front thereof, but is located within the vacuum cleaning chamber formed between the spaced parallel sealing strips and the alternately operable end closure runner members 101 and 102, one of which optionally seals solely one end of the vacuum chamber. Similarly, the spring finger plate 96 is located adjacent the leading sealing strip 69 and as before, a spring 94 yieldingly urges said strip 96 into contactual engagement with the ground surface to dislodge and loosen articles of trash having a tendency to adhere to relatively smooth surfaces such as the asphalt surfaces used on shopping center parking lots.

In the modified form of the invention shown in FIGURES 8, 9 and 10 the vacuum cleaner head is formed by a plate 16b having forwardly diverging wing portions 110 and 111. Channel strips 112 and 113 are secured along the edges of the forward and rear portions of the diverging wing sections 110 and 111. Single channel members 114 and 115 connect the end portions of the channel members 112 and 113 to form a rigid frame structure surrounding the edges of the wings 110 and 111. Mounted adjacent each end of each wing is an upstanding lug 116 to which is pivoted wheel supporting bars 117 the rear ends of which extend downwardly as at 118 and terminate in axle portions 119 having supporting wheels 120 rotatably mounted thereon.

Connected to the forward portion of the vacuum cleaner plate 16b is a forwardly converging frame structure 121 the rearwardly extending portions of which as at 122 have their ends welded or otherwise connected to the channel member 112 as at 123. Also welded to the channel member 112 and to the central portion thereof is a bar 124 which is welded in place as at 125 and is likewise welded to the forwardly converging frame 121 as at 126. Secured to the forwardly extending bar 124 as by welding or the like is the socket of a castor wheel, and the socket 127 is welded or otherwise affixed to the bar 124. Swiveled to the socket 127 is a yoke 128 between the arms of which is mounted a supporting wheel 129 on a stub axle 130. Mounted adjacent the end of each wing 110 and 112 and welded to the rear channel member 113 is an upstanding lug 131 having a series of openings 132 for receiving an adjusting pin 133 carried by each of the pivoted levers 117. Thus, removal of the pin 133 for insertion in a selected opening 132 will adjust the supporting wheels 120 so that the vacuum cleaner plate 16b can be raised or lowered with respect to the ground surface G" and thereby yieldingly urge the sealing strips into engagement with the surface under various pressures and tensions.

The sealing strips 135 and 136 are secured to the channel members 112 and 113 as before with their upper edges retained in position by removable fastening means such as is shown in FIGURES 1 to 4 inclusive. The forward sealing strip 135 is continuous while the trailing sealing strip 135 is interrupted and is connected to an elbow fitting 137 pivoted to the apex of the rear channel members 113 as at 138. The elbow 137 is provided with a suitable coupling portion 139' to which the flexible vacuum conduit (not shown) similar to that shown at 12 in FIGURE 1 is attached. The edges of the sealing strips 136 adjacent the elbow 137 are secured in place by a suitable adhesive and supporting wheels 139 are connected to the elbow 137 by a suitable axle shaft 140. The supporting wheels 139 maintain the lower edge 141 of the elbow out of ground engagement a slight distance of approximately ¼ inch to prevent the same from engaging upstanding projections during its travel along the ground surface.

Supported in suitable brackets connected to the forwardly converging frame 122 as at 142 is a bar 143 which conforms to the shape of the frame member 122 and forms hinge members for a pair of downwardly extending pivoted plates 144, there being one on each side of the forwardly extending bar 124 and the lower end of each of said plates is provided with a series of spring fingers secured as by welding or the like as at 148.

Welded or otherwise secured to the upper surface of the vacuum cleaner plate 16b is a pair of spaced lugs 149 having transverse bores 150 for receiving draft bars similar to those shown in the form of the invention illustrated in FIGURES 1 to 7 and are adapted to propel the vacuum cleaner head in substantially the same manner.

Outwardly extending runner members 151 are hinged at their rear portions to the ends of the channel members 113 as at 152, and the forward edges of said members are inwardly turned as at 153 to collect trash and articles diverted toward the sides of the vacuum cleaner head by the forwardly converging spring finger plates 145. The spring finger plates 145 are similar to the ones shown in FIGURES 1 to 7 at 100 and include a metal sheet having a series of vertically extending slots to form tooth-like members of sufficient resiliency to engage the surface and permit articles of trash to be dislodged so that they will pass beneath the leading sealing strips 135 and will be directed inwardly toward the elbow 137. Articles of trash of increased dimensions will be directed toward the ends of the vacuum cleaner head and will be gathered by the runners 151. The runners 151 may be open or closed as shown in full and dotted lines respectively in FIGURE 6. In the event that it is desired to clean from one side of the vehicle one or the other of the runners 151 are closed optionally. Normally, the runners 151 remain open to obtain the cleaning effect of the entire width of the vacuum cleaner head in which the articles of trash passing beneath the rearwardly converging sealing strip 135 will be conducted to the elbow 137 and transported to the interior of the panel truck service compartment.

In all forms of the invention the vacuum cleaner chamber is elongated and is formed by the cleaner head plates 16, 16a and 16b with the chamber formed between the spaced ground engaging sealing strips beneath said plate and in which the chamber is closed at one end, while the opposite end remote from the suction fitting is open. This structure represents a new type of vacuum cleaner in which the vacuum source produces an air current flow from the open end of the vacuum chamber in a horizontal direction toward a remote point at which the vacuum source connection is located, and accordingly more efficient vacuum cleaning is achieved on relatively smooth surfaces such as the shopping center parking lots which are generally constructed of smoothly rolled asphalt and present a surface which cannot be efficiently cleaned by conventional vacuum cleaning apparatus in which a continuous space around the vacuum cleaner head is provided with respect to the ground surface.

In all forms of the invention, the vacuum heads 16, 16a, and 16b are mounted beneath the plane of the chassis of the vehicle T and connected to the vehicle at the front, rear or intermediate the ends of said vehicle by suitable draft means.

The vacuum heads 16, 16a and 16b are of a length greater than the width of the vehicle and are approximately nine feet long so as to project beyond the sides of the vehicle. The ground engaging sealing strips are equal in length to the vacuum heads and continuous therewith and are of a width between 8 to 9 inches and of a thickness of approximately ¼ inch to be yieldingly urged into continuous sealing engagement with the ground surface.

Also, in all forms of the invention the vacuum heads 16, 16a and 16b are positioned and adjusted relative to the ground surface a distance between 6 to 7 inches so that in operation, the sealing strips being wider or deeper than this distance will yieldingly engage the ground surface and be flexed to curve in a direction opposite the direction of vehicle travel.

It is to be understood that the forms of the invention herewith shown and described are to be taken as preferred embodiments thereof, and that various changes within the scope of the appended claims may be restored to without departing from the spirit of the invention.

What I claim is:

1. In a vacuum cleaning machine, a vehicle adapted to be propelled along a horizontal pathway, a collection chamber in said vehicle, a blower on said vehicle having its intake provided with a conduit and its exhaust in communication with said chamber, a vacuum cleaner head having upper and lower chambers formed by a division wall connected to said vehicle and extending normal to said pathway, said wall having openings at each end thereof, flexible ground engaging sealing strips on the front and rear of said lower chamber of said head forming a collection chamberway, a coupling at one end of said head, selectively operable closures for the ends of said collection chamberway, selectively operable slide closures in said division wall for said openings, whereby when one of said operable closures is open in a direction toward the end of said chamberway which is closed and in which the slide closure is opened and reverse said air flow direction from the opposite end when said coupling is connected to said conduit and the other slide closure is opened with the first mentioned closure in its closed position and permit trash to be collected passing beneath the front ground engaging sealing strips, whereby air travel will flow in one direction when one of the operable closures is open and the opposite slide closure is open and will flow in a reverse direction when the other operable closure is open and the opposed slide closure is open with the first mentioned closures in their closed positions.

2. In a vacuum cleaning machine as set forth in claim 1 in which said sealing strips are formed of synthetic rubber compositions, said flexible strips being of sufficient thickness to be self sustaining and of a length and width to flex in a direction opposite to the direction of travel with the lower edge of each strip yieldingly and continuously urged into contactual sealing engagement with the surface of said pathway.

3. In a vacuum cleaning machine as set forth in claim 1 in which said cleaner head is supported by adjustable wheels to regulate the space between the head and the ground surface and the yielding pressure exerted on said sealing strips.

4. In a vacuum cleaning machine as set forth in claim 1 in which each of said sealing strips is provided with an enlarged bead strip along its upper end adapted to be slidably received in a channel member supported by said cleaner head.

5. In a vacuum cleaning machine as set forth in claim 1 in which a series of spring fingers are supported by said head in advance of the front and rear sealing strips to engage the ground surface and dislodge trash particles adhering thereto.

References Cited

UNITED STATES PATENTS

| | | |
|---|---|---|
| 484,191 | 10/1892 | Furnas. |
| 514,676 | 2/1894 | Furnas _____ 15—340 X |
| 514,677 | 2/1894 | Furnas. |
| 1,229,737 | 6/1917 | Furnas. _____ 15—340 X |
| 1,782,882 | 11/1930 | Rippey. |
| 2,146,763 | 2/1939 | Replogle _____ 15—346 |
| 3,004,279 | 10/1961 | Ringer _____ 15—340 |
| 2,531,370 | 11/1950 | Thompson _____ 15—401 X |
| 3,006,021 | 10/1961 | Patch _____ 15—340 |

FOREIGN PATENTS 318,539  6/1934  Italy.

ROBERT W. MICHELL, *Primary.*